United States Patent [19]
Yamamoto et al.

[11] Patent Number: 5,019,895
[45] Date of Patent: May 28, 1991

[54] CROSS COLOR NOISE REDUCTION AND CONTOUR CORRECTION APPARATUS IN NTSC COLOR TELEVISION IMAGE PROCESSING SYSTEM

[75] Inventors: Kazumi Yamamoto, Yokohama; Masayuki Sugasawa, Tokyo, both of Japan

[73] Assignee: Ikegami Tsushinki Co., Ltd., Tokyo, Japan

[21] Appl. No.: 533,590

[22] Filed: Jun. 5, 1990

[30] Foreign Application Priority Data

Jun. 7, 1989 [JP] Japan ................... 1-142906

[51] Int. Cl.⁵ .................. H04N 9/14; H04N 9/68; H04N 11/14
[52] U.S. Cl. ........................ 358/36; 358/16; 358/31
[58] Field of Search ........ 358/16, 31, 36, 37, 358/39, 40

[56] References Cited

U.S. PATENT DOCUMENTS

| | | | |
|---|---|---|---|
| 3,546,372 | 12/1990 | Dischert et al. | 358/37 |
| 4,609,938 | 9/1986 | Suzuki | 358/31 |
| 4,644,389 | 2/1987 | Nakagawa | 358/31 |
| 4,677,461 | 6/1987 | Mizutani | 358/37 |
| 4,853,765 | 8/1989 | Katsumata | 358/31 |
| 4,893,176 | 1/1990 | Faroudja | 358/31 |

FOREIGN PATENT DOCUMENTS

| | | | |
|---|---|---|---|
| 40381 | 4/1981 | Japan | 358/31 |
| 42483 | 4/1981 | Japan | 358/31 |
| 6390283 | 4/1988 | Japan | . |

OTHER PUBLICATIONS

Improving NTSC to Achieve Near-RGB Performance, by Yves Faroudja et al., SMPTE Journal, Aug. 1987, pp. 750 to 761.

Primary Examiner—Tommy P. Chin
Attorney, Agent, or Firm—Spencer & Frank

[57] ABSTRACT

Common use of 1H delay circuits (14 and 15), which are used as parts of a contour correction circuit (17) and a comb filter for reducing the interference between the luminance signal and the color signal (cross color noises), reduces the required number of the 1H delay circuits, and the space for mounting the 1H delay circuits, and reduces the cost.

1 Claim, 5 Drawing Sheets

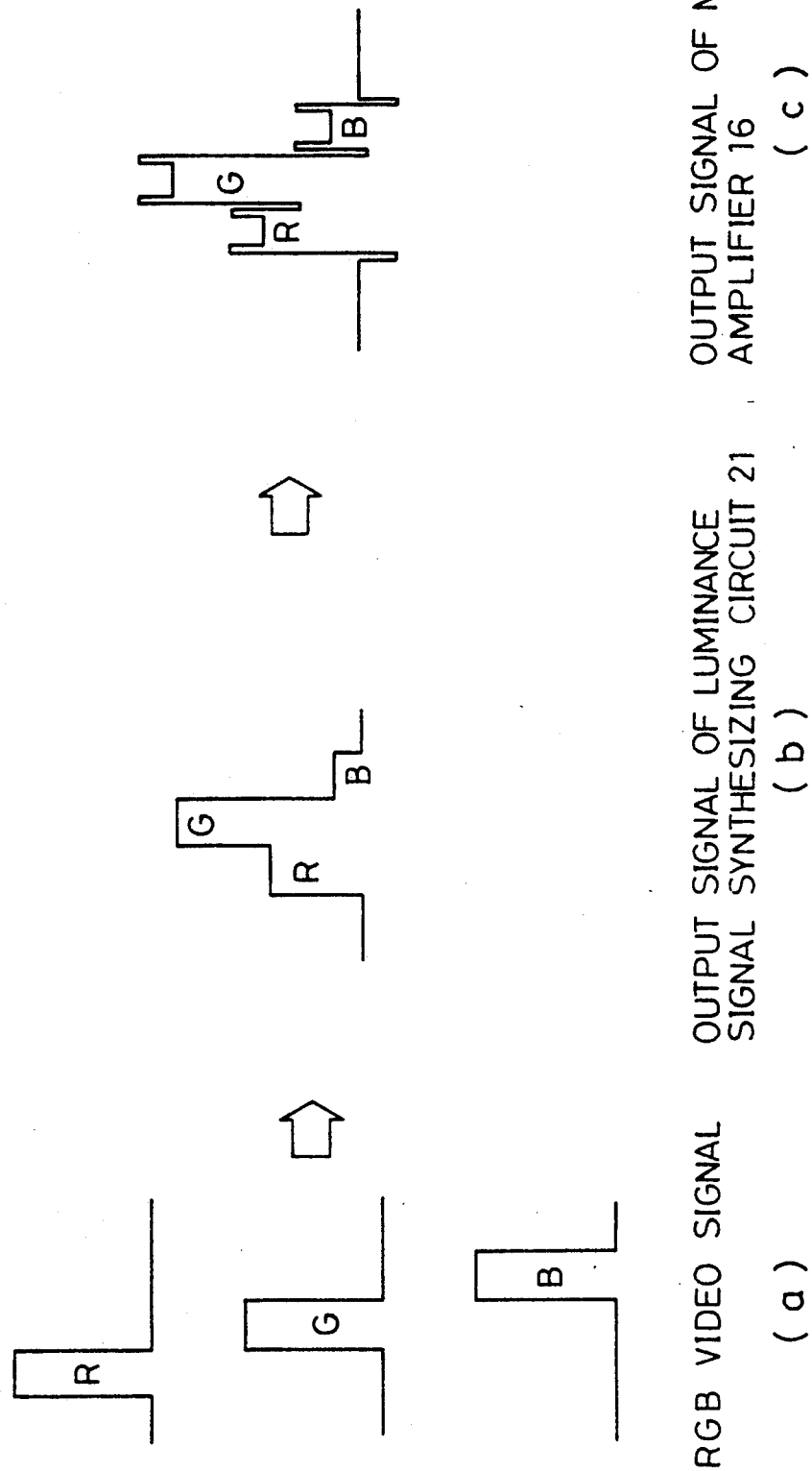

CROSS COLOR NOISE REDUCTION AND CONTOUR CORRECTION APPARATUS IN NTSC COLOR TELEVISION IMAGE PROCESSING SYSTEM

BACKGROUND OF THE INVENTION

1. Field of the Invention

The present invention relates to a cross color noise reduction and contour correction apparatus in NTSC (National Television System Committee) color television image processing system.

2. Description of the Prior Art

As a conventional contour correction apparatus, "Vertical and Horizontal Aperture Equalization" disclosed in U.S. Pat. No. 3,546,372 is known.

FIG. 1 is a block diagram showing an arrangement of this type of contour correction apparatus.

This apparatus first synthesizes output signals from respective 1H delay circuits (one horizontal scanning time delay circuits) 1 and 2, secondly produces a contour signal by synthesizing output signals from the 1H delay circuits by a contour correction signal generating circuit 3, and thirdly adds the contour signal to R, G and B signals, respectively, by mixers 4, 5 and 6.

The output signals from the mixers 4, 5 and 6 are synthesized to a luminance signal in accordance with the NTSC system or the like by a luminance signal synthesizer circuit (Y matrix) 7, and the synthesizer luminance signal is outputted from an amplifier 11. Color difference synthesizing circuits 8 and 9 produce color difference signals in accordance with the NTSC system or the like. The color difference signals are modulated by a color difference signal modulator 10 into a carrier chrominance signal (this signal is also called a "color difference signal" in general), and is produced from an amplifier 13. A mixing amplifier 12 mixes the luminance signal and the carrier chrominance signal, and produces a composite color signal to the outside.

The conventional apparatus corrects contours by the "Out of Green" method, which corrects contours by adding to the RGB signals the contour correction signal produced on the basis of the G signal of the RGB signals. As a result, the RB signals must be delayed in accordance with the G signal so that the delay time of the RB signals becomes equal to the delay time of the G signal passing through the contour correction circuit 3. This timing (phase) adjustment between the RGB signals is very difficult, particularly, when the "pixel shift" is performed with a CCD camera, which restricts its capability. Furthermore, the contour correction (contour emphasis) with regard to the PB signals has little effect as shown in FIG. 2 (portions indicated by broken circles in FIG. 2 cannot be contour corrected) because the contour correction signal is formed only from the G signal.

To solve such problems, another contour compensation circuit is proposed in Japanese patent Application Laying-Open No. 63-90283. This apparatus computes the intensity ratios of the RGB signals, adds the RGB signals weighted in accordance with the ratios, and generates a contour compensation signal according to the result of the addition. Although the apparatus can solve the above problems, it has a drawback that the circuit configuration is complicated.

On the other hand, with regard to the reduction of cross color noises, the apparatus described in U.S. Pat. No. 4,893,176 is known. This apparatus reduces cross color noises, i.e., the interference between the luminance signal and the chrominance signal by using a comb filter.

To accomplish the contour correction described in U.S. Pat. No. 3,546,372, and the cross color noise reduction described in U.S. Pat. No. 4,893,176 at the same time, at least five 1H delay circuits are required: two 1H delay circuits 1 and 2 in FIG. 1; at least two 1H delay circuits included in the comb filter for reducing cross color noises; and one 1H delay circuit for adjusting the phases of the luminance signal and the chrominance signal (this 1H delay circuit corresponds to the 1H delay circuit 18 in FIG. 3, which will be described later).

SUMMARY OF THE INVENTION

It is therefore an object of the invention to provide a cross color noise reduction and contour correction apparatus in NTSC color television image processing system that can reduce the number of 1H delay circuits as well as the space for mounting the 1H delay circuits, thus reducing the cost of the apparatus.

Another object of the present invention is to provide a cross color noise reduction and contour correction apparatus in NTSC color television image processing system that can perform precise contour correction, and reduce the cross color noises and asynchronous noises produced in the camera.

To accomplish the above objects of the present invention, there is provided a cross color noise reduction and contour correction apparatus in NTSC color television image processing system for generating a luminance signal, a composite color signal, and a chrominance signal with correcting contours of images on the basis of R, G, and B signals, the cross color noise reduction and contour correction apparatus comprising: synthesizing means for generating a synthesized luminance signal from the R, and B signals; color difference signal synthesizing means for generating synthesized color difference signals from the R, G, and B signals; modulation means for modulating the synthesizer color difference signals produced from the color difference signal synthesizing means to generate a color difference signal; first delay means for delaying the synthesized luminance signal synthesized by the synthesizing means by one horizontal scanning time; second delay means for further delaying the signal which is delayed by the first delaying means by one horizontal scanning time; contour correction means for correcting the contours of images on the basis of the signals produced from the first delay means, the second delay means, and the synthesizing means; first mixing means for mixing the signals produced from the contour correction means, the first and second delaying means, and the synthesizing means to generate the luminance signal the contours of which are corrected; third delay means for delaying the color difference signal produced from the modulation means by one horizontal scanning time; second mixing means for mixing the signals produced from the third delay means and the modulation means to generate the chrominance signal; and third modulation means for mixing the signals form the second mixing means and the first mixing means to generate the composite color signal.

The above and other objects, effects, features and advantages of the present invention will become more apparent from the following description of an embodiment thereof taken in conjunction with the accompanying drawings.

BRIEF DESCRIPTION OF THE DRAWINGS

FIG. 5 is a waveform chart for explaining the contour correction of the embodiment.

DETAILED DESCRIPTION OF THE PREFERRED EMBODIMENTS

The invention will now be described with reference to the accompanying drawings.

Figure 1:
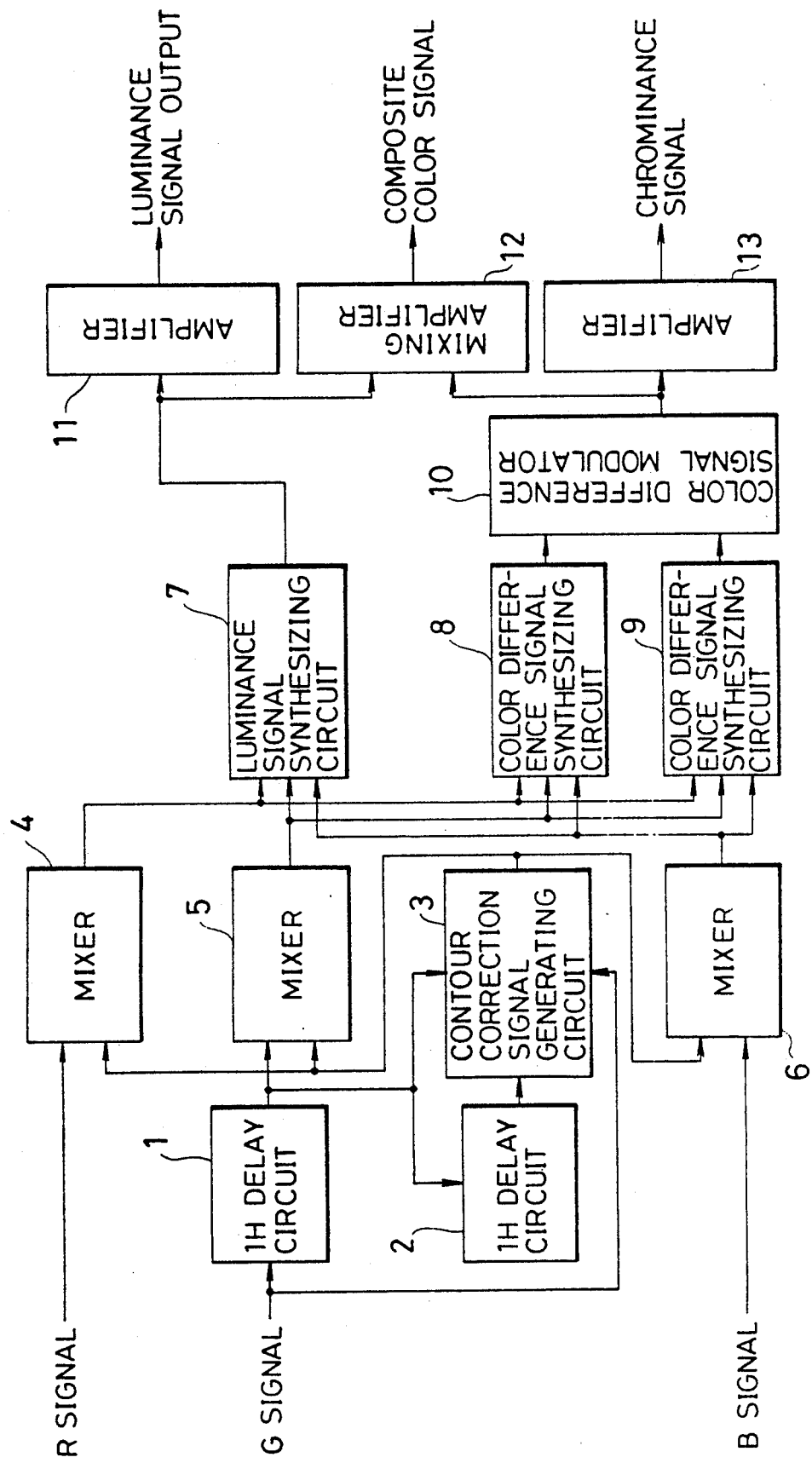
FIG. 1 is a block diagram showing an arrangement of a contour correction apparatus of a conventional color television image processing system.
Figure 2:
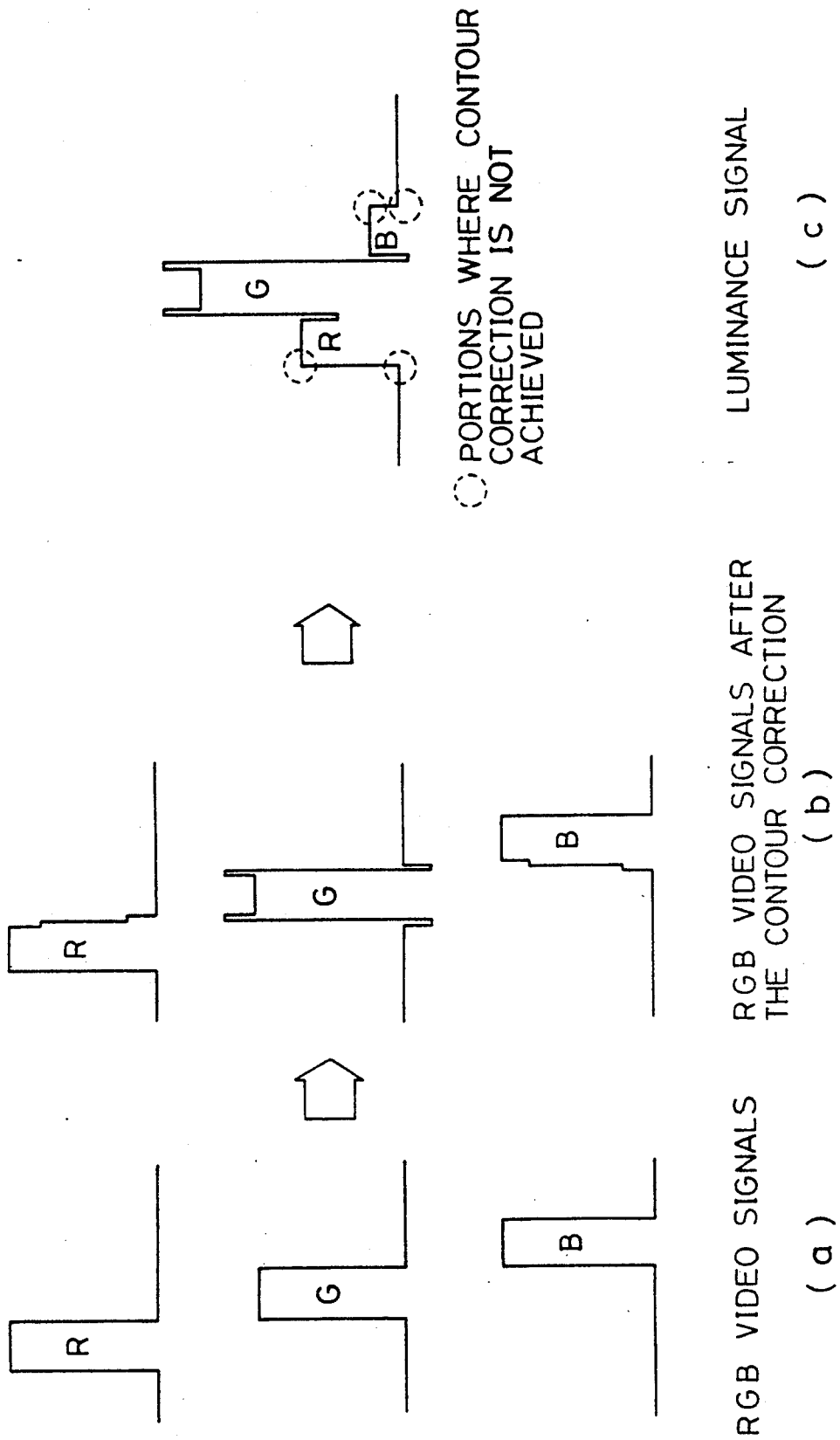
FIG. 2 is a waveform chart for explaining the conventional contour correction by the apparatus of FIG. 1.
Figure 3:
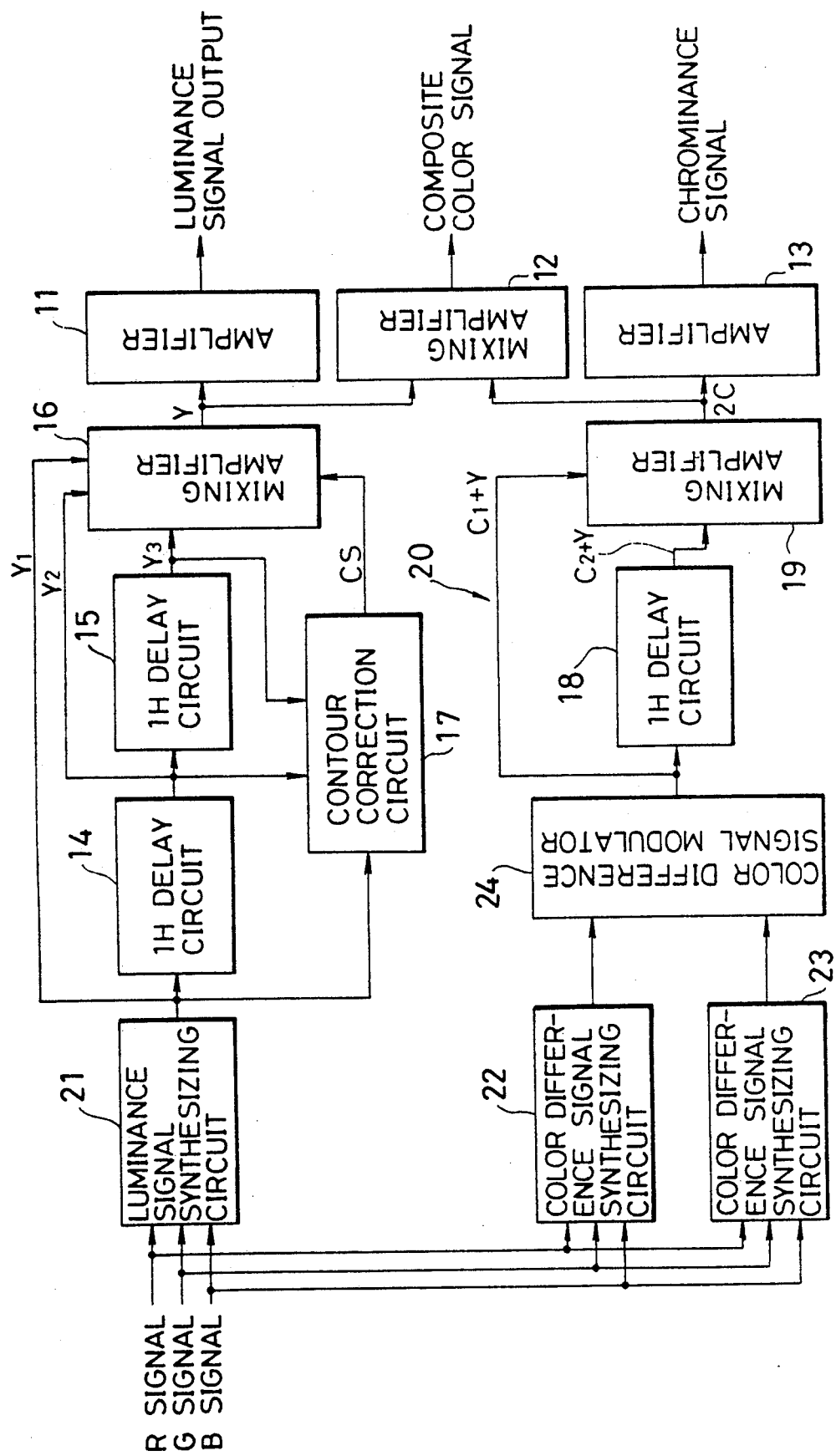
FIG. 3 is a block diagram showing an arrangement of an embodiment of the present invention.

FIG. 3 is a block diagram showing an arrangement of an embodiment of the present invention. This arrangement is an example of the NTSC color television image processing system.

In FIG. 3, a luminance signal synthesizing circuit 21 (synthesizing means) adds an R signal, a G signal and a B signal in accordance with predetermined ratios (for example, 0.30:0.59:0.11) to produce a synthesized luminance signal Y1. A 1H delay circuit 14 (first delay means) delays the luminance signal Y1 by one horizontal scanning time (1H), and produces a 1H delayed luminance signal Y2. A 1H delay circuit 15 (second delay means) delays the luminance signal Y2 by 1H, and produced a 2H delayed luminance signal Y3. A contour correction circuit 17 generates contour correction signal CS by calculating the difference of the signals Y1, Y2, and Y3 fed from the luminance signal synthesizing circuit 21, and the 1H delay circuits 14 and 15. The 1H delay circuits 14 and 15, and the contour correction circuit 17 constitute a contour correction means. A mixing amplifier 16 mixes and amplifies the signals Y1, Y2, Y3, and CS supplied from the luminance signal synthesizing circuit 21, the 1H delay circuits 14 and 15, and the contour correction circuit 17.

Figure 4:
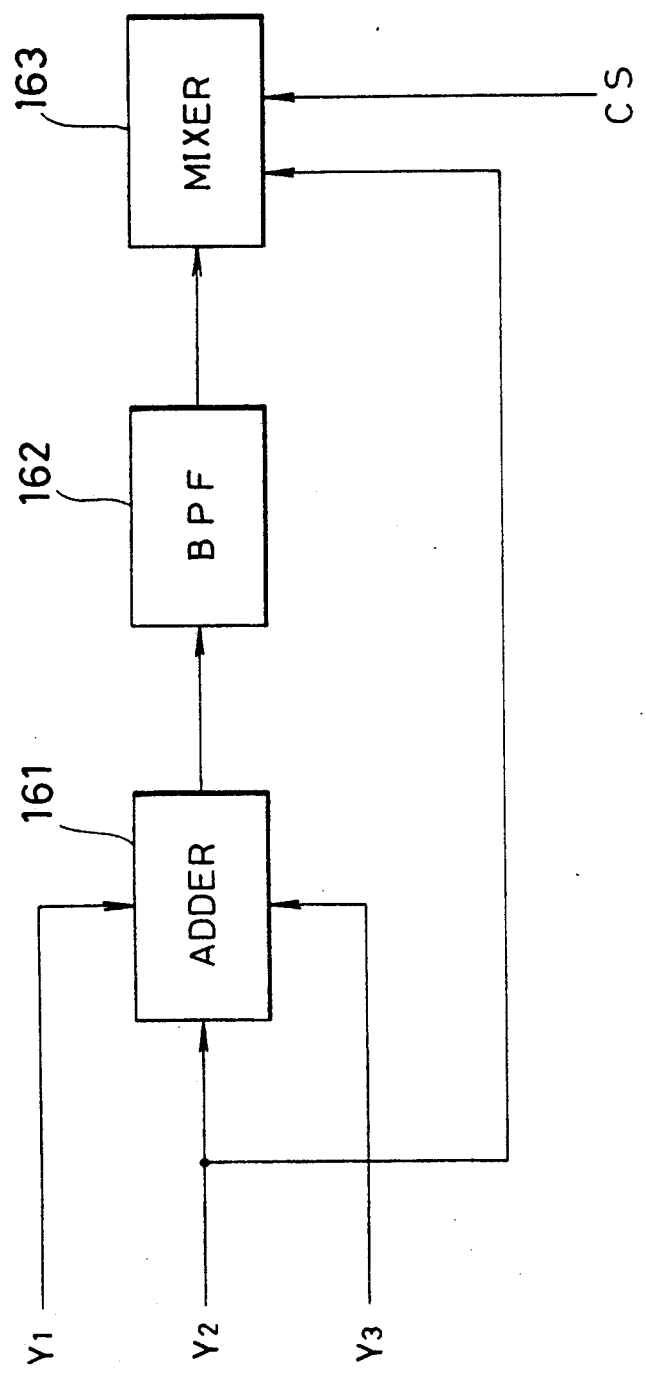
FIG. 4 is a block diagram showing an arrangement of a mixing amplifier 16 of the embodiment.

FIG. 4 is a block diagram of the mixing amplifier 16. In this figure, an adder 161 performs operation $\{(Y1 +Y3)/2 -Y2\}$ between three signals Y1, Y2, and Y3, which are supplied from the luminance signal synthesizing circuit 21, 1H delay circuit 14, and 1H delay circuit 15, respectively. The output of the adder 161 includes a low-frequency component of 15.75 kHz generated by the above operation. A BPF (Band-Pass Filter) 162 removes this low-frequency component, thus producing carrier chrominance signal. A mixer 163 subtracts the carrier chrominance signal from the luminance signal Y2, adds the contour correction signal CS, and produces the luminance signal Y.

Color difference signal synthesizing circuits 22 and 23 (color difference signal synthesizing means) generate a color difference signal from the RGB signals in accordance with the television system (in this case, the NTSC system). A color difference signal modulator 24 modulates the signals supplied from the color difference signal synthesizing circuits 22 and 23 by using the quadrature-amplitude modulation, thereby to generate a carrier chrominance signal (this signal is generally called "color difference signal" as well). A 1H delay circuit 18 (third delay means) delays the signal from the color difference signal modulator 24 by 1H to adjust the phases of the luminance signal and the color difference signal. A mixing amplifier 19 (second mixing means) performs a subtraction $\{(C1 +Y)-(C2\ Y)\}$ between the output (C1 +Y) of the color difference signal modulator 24 and the output (C2 +Y) of the 1H delay circuit 18. By this subtraction, only the color difference signal (i.e., carrier chrominance signal) 2C (=C1 +C2) is produced from the mixing amplifier 19 because the phase of the subcarrier rotates by 180 degrees per 1H in the NTSC system, and so the color difference signals C1 and C2 have opposite phases.

An amplifier 11 amplifies the signal from the mixing amplifier 16, and produces a luminance signal. A mixing amplifier 12 mixes and amplifies the signals from the mixing amplifiers 16 and 19, and produces a composite color signal. An amplifier 13 amplifies the signal from the mixing amplifier 19, and produces a carrier chrominance signal.

According to the embodiment, the mixing amplifier 16 synthesizes the signals from the luminance signal synthesizing circuit 21, the 1H delay circuit 14 and 15, and the contour correction circuit 17. As a result, the subcarrier included in the luminance signal and used for modulating the color difference signal is suppressed, thus reducing the asynchronous noises.

Furthermore, this embodiment can reduce the cross color noises because it utilizes the characteristics that the signals having 1H time difference are similar in their contents, and that the subcarriers of the color signals of the adjacent scanning lines have opposite phases.

The embodiment of the present invention has the following advantages.

(1) The luminance signal synthesizing circuit 21 synthesizes the R signal, the G signal and the B signal into one luminance signal with maintaining the phases of each signals as illustrated by (a) in FIG. 5. After that, the synthesized luminance signal undergoes the contour correction as illustrated by (c) in FIG. 5. Thus, the appropriately corrected signal is produced from the mixing amplifier 16.

(2) By adding or subtracting a horizontal scanning line signal and the signals produced by delaying the scanning line signal by 1H and 2H, the frequency component corresponding to the chrominance subcarrier (carrier of the color signal) or the neighboring components thereof can be entirely eliminated. Thus, the interference (i.e., cross color noises) from the original chrominance subcarrier (the frequency of which is fsc) to the luminance signal can be eliminate.

(3) The cross color noise reduction circuit and the contour correction circuit use 1H delay circuits 14 and 15 in common. As a result, the number of 1H delay circuit and the mounting space can be reduced, thus decreasing the cost.

(4) The contour correction signal is generated from the luminance signal. As a result, the deterioration of the performance of a television camera resulted from the phase difference can be prevented.

Although a specific embodiment of a cross color noise reduction and contour correction apparatus in NTSC color television image processing system constructed in accordance with the present invention has been disclosed, it is not intended that the invention be restricted to either the specific configurations or the uses disclosed herein. Modifications may be made in a manner obvious to those skilled in the art. Accordingly, it is intended that the invention be limited only by the scope of the appended claims.

What is claimed is:

1. A cross color noise reduction and contour correction apparatus in NTSC color television image processing system for generating a luminance signal, a composite color signal, and a chrominance signal with correcting contours of images on the basis of R, and B signals, said cross color noise reduction and contour correction apparatus comprising:

synthesizing means for generating a synthesized luminance signal from said R, G, and B signals;

color difference signal synthesizing means for generating synthesized color difference signals from said R, G, and B signals;

modulation means for modulating said synthesized color difference signals produced from said color difference signal synthesizing means to generate a color difference signal;

first delay means for delaying said synthesized luminance signal synthesized by said synthesizing means by one horizontal scanning time;

second delay means for further delaying the signal which is delayed by said first delaying means by one horizontal scanning time;

contour correction means for correcting said contours of images on the basis of the signals produced from said first delay means, said second delay means, and said synthesizing means;

first mixing means for mixing the signals produced from said contour correction means, said first and second delaying means, and said synthesizing means to generate said luminance signal the contours of which are corrected;

third delay means for delaying said color difference signal produced from said modulation means by one horizontal scanning time;

second mixing means for mixing the signals produced from said third delay means and said modulation means to generate said chrominance signal; and third mixing means for mixing the signals form said second mixing means and said first mixing means to generate said composite color signal.

* * * * *